US008846564B2

(12) United States Patent
Wang et al.

(10) Patent No.: US 8,846,564 B2
(45) Date of Patent: Sep. 30, 2014

(54) PROCESS FOR SULFIDING CATALYSTS FOR A SOUR GAS SHIFT PROCESS

(75) Inventors: Justin X. Wang, Louisville, KY (US); Yeping Cai, Louisville, KY (US)

(73) Assignee: Clariant Corporation, Louisville, KY (US)

( * ) Notice: Subject to any disclaimer, the term of this patent is extended or adjusted under 35 U.S.C. 154(b) by 904 days.

(21) Appl. No.: 12/567,340

(22) Filed: Sep. 25, 2009

(65) Prior Publication Data

US 2010/0081567 A1  Apr. 1, 2010

Related U.S. Application Data

(60) Provisional application No. 61/100,824, filed on Sep. 29, 2008.

(51) Int. Cl.
B01J 27/02 (2006.01)
B01J 27/049 (2006.01)
C01B 3/16 (2006.01)
B01J 37/20 (2006.01)
B01J 23/85 (2006.01)

(52) U.S. Cl.
CPC .. C01B 3/16 (2013.01); B01J 23/85 (2013.01); B01J 37/20 (2013.01)
USPC ........... 502/220; 502/216; 502/219; 502/221; 502/222; 208/209; 208/108; 208/213; 208/215; 208/217

(58) Field of Classification Search
CPC .............. C01B 3/16; B01J 37/20; B01J 23/85
USPC .......... 502/216, 219, 220, 221, 222; 208/209, 208/213, 215, 217

IPC .............................................. C01G 45/00,45/04
See application file for complete search history.

(56) References Cited

U.S. PATENT DOCUMENTS

| 3,061,555 | A | 10/1962 | McGrew et al. |
| 3,529,935 | A | 9/1970 | Lorenz et al. |
| 3,591,487 | A | 7/1971 | Schutt |
| 3,850,840 | A | 11/1974 | Aldridge et al. |
| 3,957,962 | A | 5/1976 | Ramsbotham |
| 4,040,979 | A | 8/1977 | Gembicki et al. |
| 4,077,907 | A | 3/1978 | Khera |
| 4,153,580 | A | 5/1979 | Hausberger et al. |
| 4,233,180 | A | 11/1980 | Hausberger et al. |
| 4,389,335 | A | 6/1983 | Merriam et al. |

(Continued)

OTHER PUBLICATIONS

International Search Report dated Dec. 1, 2010, with respect to international application serial No. PCT/US2009/058573.

(Continued)

*Primary Examiner* — Jun Li
(74) *Attorney, Agent, or Firm* — Scott R. Cox

(57) ABSTRACT

A process for the sulfidation of a sour gas shift catalyst, wherein the temperature of the sulfidation feed stream is coordinated with the sulfur/hydrogen molar ratio in that feed stream to obtain enhanced performance of the sour gas shift catalyst. In the sulfidation process to produce a sour gas shift catalyst, the lower the sulfur to hydrogen molar ratio of the sulfidation feed stream, the lower the required temperature of the sulfidation feed stream. The sulfidation reaction can be further enhanced by increasing the pressure on the sulfidation feed stream.

15 Claims, 2 Drawing Sheets

(56) References Cited

U.S. PATENT DOCUMENTS

| | | | |
|---|---|---|---|
| 4,452,854 A | | 6/1984 | Merriam et al. |
| 4,530,917 A | | 7/1985 | Berrebi |
| 4,719,195 A | | 1/1988 | Toulhoat et al. |
| 4,748,142 A | * | 5/1988 | Chianelli et al. ............... 502/220 |
| 4,826,797 A | * | 5/1989 | Chianelli et al. ............... 502/221 |
| 5,266,188 A | * | 11/1993 | Kukes et al. ............... 208/216 R |
| 5,922,638 A | | 7/1999 | Dufresne et al. |
| 5,958,816 A | | 9/1999 | Neuman et al. |
| 5,985,787 A | | 11/1999 | Dufresne et al. |
| 6,019,954 A | | 2/2000 | Tang et al. |
| 6,100,216 A | | 8/2000 | Dufresne et al. |
| 6,290,841 B1 | | 9/2001 | Gabrielov et al. |
| 6,291,391 B1 | | 9/2001 | MacArthur |
| 6,417,134 B1 | | 7/2002 | Dufresne et al. |
| 6,753,291 B2 | | 6/2004 | Eijsbouts et al. |
| 2002/0013223 A1 | | 1/2002 | Eijsbouts et al. |
| 2006/0060500 A1 | * | 3/2006 | Guillaume et al. ............ 208/108 |
| 2007/0129243 A1 | * | 6/2007 | Wheelock et al. ............. 502/300 |

OTHER PUBLICATIONS

Written Opinion of the International Searching Authority dated Dec. 1, 2010 with respect to international application serial No. PCT/2009/058573.

* cited by examiner

PROCESS FOR SULFIDING CATALYSTS FOR A SOUR GAS SHIFT PROCESS

CROSS-REFERENCE TO RELATED APPLICATION

This application claims priority from U.S. Provisional Application Ser. No. 61/100,824, filed on Sep. 29, 2008.

TECHNICAL FIELD

This disclosure relates to processes for sulfidation of catalysts, particularly a sour gas shift catalyst, including preparing a sour gas shift catalyst, preparing a feed stream comprising hydrogen and a sulfur containing compound, passing the feed stream over the sour gas shift catalyst while coordinating (a) the molar ratio between the hydrogen and the sulfur present in the sulfur containing compound in the feed stream, and (b) the temperature of the feed stream, while the catalyst is being sulfided by the feed stream, such that when the molar ratio of the sulfur to the hydrogen in the feed stream increases, the temperature of the feed stream is increased, thereby producing a sulfided sour gas shift catalyst exhibiting enhanced CO conversion. An alternative embodiment increases the pressure on the sulfidation feed stream, while coordinating the molar ratio between the hydrogen and the sulfur present in the feed stream and the temperature of the feed feed stream, which embodiment also results in enhancement of the activity of the sulfided sour gas shift catalyst.

BACKGROUND ART

This section is intended to introduce the reader to various aspects of art that may be related to various aspects of the present invention, which are described below. However, it should be understood that these statements are to be read in light of this disclosure, and not as admissions of prior art.

Water-gas shift conversion reactions have been known for many years as a method of producing hydrogen and $CO_2$ from carbon monoxide and steam. When little or no sulfur-containing compounds are present in the water-gas shift feed stream, this reaction is often referred to as a "sweet gas shift" reaction. Many catalytic materials have been used for the sweet gas shift reaction. For example, hydrogen can be prepared by passing carbon monoxide and steam over nickel or cobalt on a refractory porous material. Another common water-gas shift catalyst comprises copper oxide-zinc oxide. Another alternative water-gas shift catalyst utilizes iron oxide-chromium oxide.

Unfortunately, these catalysts do not tolerate small quantities of sulfur in the feed. As coal, coke and heavy hydrocarbon feeds suitable for conversion to hydrogen generally contain appreciable quantities of sulfur or sulfur containing compounds, such feeds can not be used with conventional water-gas or sweet gas shift catalysts.

Because of the increasing shortage of sulfur-free feed stocks and the increasing availability of feed stocks containing relatively high percentages of sulfur compounds, sometimes referred to as "sour gas feeds", the need has become apparent for the development of carbon monoxide water-gas shift catalysts which can operate effectively in feed streams containing more than a nominal quantity of sulfur or sulfur-containing materials. This reaction is referred to as a "sour gas shift" reaction ("SGS").

Various types of catalysts have been proposed for use in these sulfur containing feeds for sour gas shift reactions, particularly catalysts containing a combination of cobalt or nickel and molybdenum or tungsten. It is known that oxide catalysts made from these materials must be converted to their corresponding sulfided state to permit reasonable activity. In fact, in sour gas shift reactions, sulfur or sulfur containing compounds are required to be present in the feed stream or the sour gas shift catalyst will be deactivated. Accordingly, it is necessary to perform a sulfidation reaction, sometimes referred to as a sulfurization or presulfurization reaction, on the precursor sour gas shift catalysts prior to their utilization as sour gas shift catalysts in a feed containing sulfur or sulfur containing compounds. This sulfidation process can occur in situ or ex-situ with sulfidation occurring at a separate location or facility than the location at which the sour gas shift reaction occurs being preferred.

The process for sulfidation of sour gas shift catalysts has not been studied in depth. In the past, this sulfidation reaction has typically been conducted on precursor sour gas shift catalysts using the same sulfidation processes utilized for sulfidation of catalysts used for hydrotreating, hydrocracking or hydroconversion. Typically, "hydrotreating" refers to converting organic sulfur or nitrogen to hydrogen sulfide or ammonia in the presence of hydrogen. "Hydrocracking" refers to the treatment of heavy fuel fractions to convert them to lighter fractions, such as gasoline, jet fuels and gas oils. "Hydroconversion of hydrocarbons" refers to hydrocarbon (olefin) saturation during the process of hydrotreating. Co (Ni)—Mo (W)/carrier based catalysts, which are commonly used for hydrotreating and/or hydroconversion of hydrocarbons, can be sulfided in-situ or ex-situ utilizing sulfur containing compounds. Typical sulfidation conditions for these reactions utilize a wide range of $S/H_2$ ratios (0.03/1 to 20/1) and temperatures (200 to 600 C). However, the preferred sulfidation temperature is 300 to 400 C. There are no accepted limitations on the acceptable ratio of $S/H_2$ for the sulfidation of the catalysts for these reactions, regardless of the temperature of the feed stream.

In contrast to hydrotreating, hydrocracking and hydroconversion reactions, the sour gas shift reaction is a reaction whereby carbon monoxide and steam are converted into carbon dioxide and hydrogen in the presence of sulfur compounds.

Although processes for the sulfidation of sour gas shift catalysts based on sulfidation procedures utilized for these other reactions have been employed, there are no recognized procedures that have been accepted specifically for sour gas shift catalyst sulfidation. Thus, there is a need for analysis and improvement in the process for the sulfidation, specifically for sour gas shift catalysts.

DISCLOSURE OF EMBODIMENTS OF THE INVENTION

One embodiment of the invention relates to a process for the sulfidation of a sour gas shift catalyst, which catalyst is prepared by adding at least one catalytically active material to a selected carrier, whereby the temperature of the sulfidation sulfidation reaction is coordinated with the ratio of the sulfur which is present in the sulfidation feed stream and which is derived from one or more sulfur-containing compounds that comprise, or can be converted to comprise, hydrogen sulfide in the presence of hydrogen, to the hydrogen that is also present in the sulfidation feed stream.

It has surprisingly been discovered in an alternative embodiment that when high sulfur/hydrogen molar ratios are present in the sulfidation feed stream, up to about 20:1 or so, a higher temperature for the sulfidation process is necessary, up to as high as about 600° C. or so to produce sour gas shift catalysts with enhanced CO conversion. It has also been surprisingly discovered, in an alternative embodiment, that when low sulfur/hydrogen ratios are present in the sulfidation feed stream, down to about 1:100 or so, a lower temperature for the sulfidation reaction is appropriate, down to as low as 300° C. or so, to produce sour gas shift catalysts with acceptable CO conversion. If lower or higher temperatures for the feed stream are used to sulfide the sour gas shift catalysts than are indicated by the molar ratio between the sulfur, present in the sulfur-containing compounds, and the hydrogen, then optimized sour gas shift activity may not be achieved.

It has also surprisingly been discovered, in an alternative embodiment, that when a sour gas shift catalyst is subjected to a feed stream containing hydrogen and a sulfur containing compound, a sulfided sour gas shift catalyst exhibiting enhanced CO conversion is produced if the molar ratio of the sulfur, present in the sulfur containing compound, to the hydrogen in the feed stream is coordinated with the temperature of the feed stream. Specifically, in one embodiment, as the molar ratio of the sulfur containing compound to the hydrogen in the feed stream increases, the temperature of the feed stream should be increased to produce catalysts effective for the sour gas shift reaction.

It has also been surprisingly discovered, in an alternative embodiment, that better performing sulfided gas shift catalysts are produced when the sour gas shift catalysts are subjected to a feed stream containing hydrogen and a sulfur containing compound, wherein the ratio of the sulfur, present in the sulfur containing compound, to the hydrogen is within a range from about 1:100 to about 1.5:1, alternatively from about 1:10 to 1:5, and the temperature of the feed stream is between about 300° C. and about 470° C., alternatively between about 420° C. and about 440° C.

It has also surprisingly been discovered, in an alternative alternative embodiment, that when a sour gas shift catalyst is subjected to a feed stream containing hydrogen and a sulfur containing compound, a sulfided sour gas shift catalyst exhibiting enhanced CO conversion is produced if the molar ratio of the sulfur, present in the sulfur containing compound, to the hydrogen in the feed stream is coordinated with the temperature of the feed stream and the pressure of the feed stream is increased above atmospheric pressure.

MODES FOR CARRYING OUT EMBODIMENTS OF THE INVENTION

Figure 1:
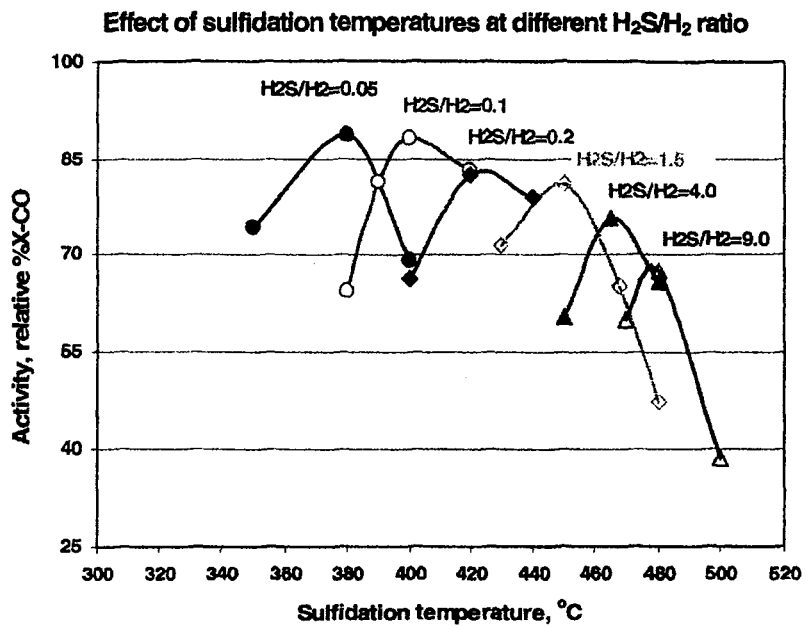
FIG. 1 is a graph showing CO conversion of sour gas shift catalysts of the same composition which have been sulfided at different $H_2S:H_2$ ratios and at different sulfidation temperatures.

One embodiment of the invention involves a process for the sulfidation of catalysts useful for sour gas shift reactions. An alternative embodiment of the invention relates to optimization of the sulfidation feed stream temperature and ratio of sulfur present in the feed stream in the form of sulfur-containing compounds that can be converted to hydrogen sulfide in the presence of hydrogen, to the hydrogen present in the sulfidation feed stream. An alternative embodiment of the invention relates to the impact of increased pressures of the sulfidation feed stream on the performance of sour gas shift catalysts whereby the sulfidation feed stream temperature and ratio of sulfur, present in the feed stream in the form of sulfur containing compounds that can be converted to hydrogen sulfide in the presence of hydrogen, to the hydrogen present in the sulfidation feed stream, are also coordinated.

The catalysts used for the sour gas shift reactions comprise a carrier (support) onto which metals, generally selected from cobalt or nickel and molybdenum or tungsten are added.

Carriers for catalysts useful for sour gas shift reactions include, but are not limited to, zinc oxide, magnesium oxide, aluminate spinels, magnesium aluminate spinels, clays, alumina, stabilized alumina, which upon calcination is transformed into a gamma phase alumina, promoted alumina and zeolites.

The promotional effect of the addition of an alkali metal compound, such as sodium oxide, potassium oxide or cesium oxide, to the sour gas shift catalyst has also been demonstrated. Thus, in one embodiment, an alkali metal compound, such as cesium or potassium oxide, is added to the carrier in quantities from about 0.1 to about 20 percent, by weight, to enhance the activity of the sour gas shift catalyst.

In addition, in one embodiment, at least one of magnesium, zinc and a rare earth metal in the form of oxides may be added to the carrier in an amount from about 5 percent to about 30 percent to increase the stability of the catalyst against steam impact.

In one embodiment the catalytically active constituents added to the carrier comprise cobalt and/or nickel and molybdenum and/or tungsten. These active constituents are added to the carrier by conventional procedures, such as co-dipping/sequential dipping, or co-impregnation/sequential impregnation with the components added in the form of water soluble salt solutions. Thus, for example, the cobalt and/or nickel constituent can be impregnated onto the carrier using an amine carbonate solution or a nitrate solution so that the finished concentration of the cobalt and/or nickel component in the finished catalysts amounts to about 1 to 10 percent by weight of the total catalysts. Molybdenum and/or tungsten is usually added, for example, in the form of ammonium molybdate and/or ammonium tungstate dissolved in an aqueous solution. In this embodiment, the catalyst carriers are dipped until the concentration of the molybdenum and/or tungsten component on the finished catalyst is in the range of about 4 to 16 percent. In an alternative embodiment the range is from about 5 to 12 percent, based on the total catalyst weight.

After dipping/impregnation, the catalyst is dried and calcined to convert the cobalt and/or nickel and molybdenum and/or tungsten compounds to their oxide form. In one embodiment, the production of the catalyst involves two calcination steps. The first calcination is of the shaped or formed carrier to convert its non-oxide constituents to oxides and to allow any stabilizing oxides utilized to enter the carrier material. Following the dipping or impregnation of the active constituents onto or in the carrier material, a second calcination occurs at a temperature from about 300° C. to about 600° C. to convert the salts and/or amines of the cobalt and/or nickel and molybdenum and/or tungsten into their oxide form. In an alternative embodiment, the production of the catalyst involves only one calcination step. In this process the active components and the carrier are calcined after formation and then shaped or formed for final use.

Following the preparation of the catalyst, it should be sulfided so that it can be used for the sour gas shift reaction. The catalysts are treated with a sulfur containing gas, such as a mixture of hydrogen and hydrogen sulfide, a mixture of hydrogen and carbon disulfide, a mixture of hydrogen and a mercaptan, such as butyl mercaptan, or a mixture of hydrogen and thiophenic compounds, dimethylsulfides or dimethyldisulfides. Any sulfur containing compound that can be converted to hydrogen sulfide in the presence of hydrogen is within the scope of this sulfidation process. In addition, carrier gases, such as $N_2$ and hydrocarbon can be blended into the feed stream. The sulfidation process generally takes several hours and occurs by means of passing a hydrogen sulfide mixture, or a mixture containing other sulfur compounds that can be converted to hydrogen sulfide in the presence of hydrogen, and carriers gases, if required, over the precursor catalyst at a conventional space velocity.

It has surprisingly been discovered in one embodiment that the performance of the sour gas shift catalyst can be enhanced if the sulfidation conditions are carefully controlled. It has been surprisingly found that the sulfidation temperature should be correlated with the ratio of the sulfur to hydrogen in the sulfidation feed stream to obtain the best performance of the catalyst. For this disclosure, the "ratio" is the molar ratio of "sulfur to hydrogen" (also denoted as "sulfur/hydrogen" or "$S:H_2$" herein) with the sulfur added by use of hydrogen sulfide or any sulfur-containing compound that can be converted to hydrogen sulfide in the presence of hydrogen.

In one embodiment it has surprisingly been discovered that when there is a higher ratio of sulfur to hydrogen present in the sulfidation feed stream, the temperature of the sulfidation process needs to be higher and when the ratio of the sulfur to hydrogen in the sulfidation feedstream is lower, the temperature of the sulfidation process should be lower. While not wanting to be bound by a particular theory, it is believed that the sulfidation process is controlled by a competition between the sulfidation reaction and a reduction process. Sulfidation occurs at lower temperatures whereas higher temperatures favor the reduction reaction. The rate of sulfidation may be a function of the sulfur (S) partial pressure. On the other hand, the hydrogen ($H_2$) partial pressure may control the reduction rate. The best performance of the catalysts can be achieved by balancing these two reactions and by aligning reaction reactions and by aligning reaction temperatures and sulfur/hydrogen ratios. In an alternative embodiment, to encourage the sulfidation reaction and produce sour gas shift catalysts with enhanced activity, the sulfidation conditions should be lower temperatures, within the acceptable sulfidation temperatures range, and reduced ratios of sulfur to hydrogen within acceptable ranges.

Figure 2:
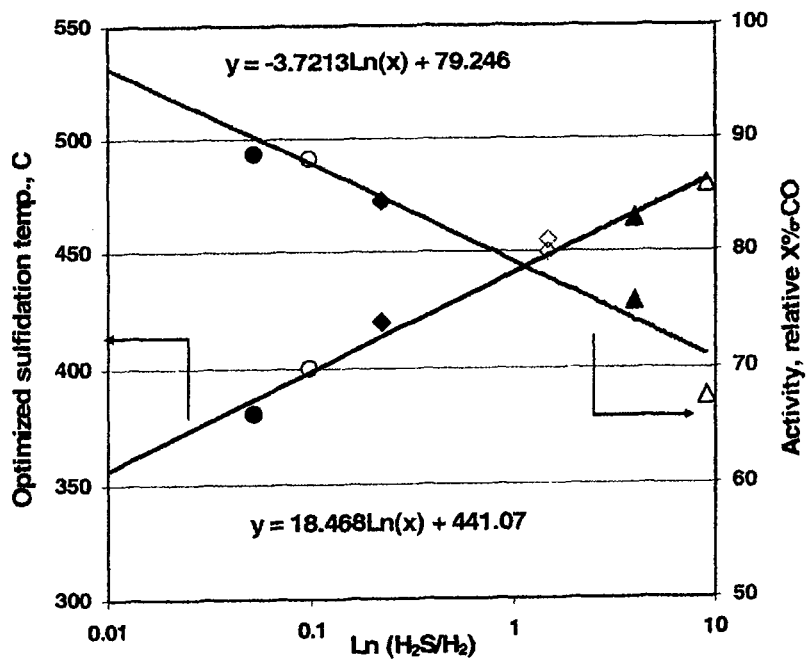
FIG. 2 is a graph showing logarithmic relationships of activity and optimized sulfidation temperature for selected sour gas shift catalysts from FIG. 1 sulfided at different $H_2S:H_2$ ratios.

It has been surprisingly discovered in one embodiment that when the sulfidation reaction occurs at a lower molar ratio of the sulfur to hydrogen, the sulfidation temperature should be a lower temperature within the acceptable sulfidation temperature range. Sulfidation generally can occur at temperatures ranging from 250° C. to 600° C., and alternatively from 300° C. to 500° C. When the molar ratio of the sulfur to hydrogen is as low as 1:100, in one embodiment, improved performance for the catalyst occurs when the catalyst is sulfided at a temperature from about 300° C. to about 400° C. ("Improved performance" means at least improved conversion of CO to $CO_2$ during a sour gas shift reaction over sour gas shift catalysts sulfided under different sulfidation conditions.) When the molar ratio of sulfur to hydrogen in the feed stream is increased to about 1:10, in one embodiment, for improved performance, the sulfidation temperature is from about 380° C. to about 420° C., alternatively around 400° C. or so. When around 400° C. or so. When the molar ratio of the sulfur to the hydrogen in the feed stream is about 1:5, in one embodiment, for improved performance, the sulfidation temperature is from about 400° C. to about 440° C., alternatively around 420° C. When the molar ratio of the sulfur to the hydrogen in the feed stream is about 3 to about 2, in one embodiment, for improved performance, the sulfidation temperature is from about 420° C. to about 480° C., alternatively around 450° C. or so. When the molar ratio of the sulfur to the hydrogen in the feed stream is about 4:1, in one embodiment, for improved performance, the sulfidation temperature is from about 440° C. to about 480° C., alternatively around 460° C. or so. When the molar ratio of the sulfur to the hydrogen in the feed stream is about 9:1, in one embodiment, for improved performance, the sulfidation temperature is from about 470° C. to about 500° C., alternatively around 480° C. or so. In addition, as shown in FIGS. 1 and 2, improved performances for sour gas shift catalysts is achieved when the molar ratio of sulfur to hydrogen in the feed stream is reduced below 1.5:1, alternatively below 1:10, to as low as 1:100, alternatively as low as 1:20, and the temperature of the sulfidation feed is coordinated with these lower molar ratios in a range between about 300° C. and 470° C., alternatively between 340° C. and 420° C.

Effective sulfidation may occur at even lower molar ratios of sulfur to hydrogen if the sulfidation reaction is permitted to run for longer periods of time. While sulfidation can also occur at lower temperatures or higher temperatures than described above, catalysts sulfided for conventional periods of time, at temperatures too high or too low, based on the sulfur/hydrogen ratio, may not perform as well for CO conversion, as described above.

It has also been surprisingly discovered, in an alternative embodiment, that the performance of the catalyst can be improved by increasing the pressure on the sulfided feed stream. By increasing the pressure on the sulfidation feed stream above atmospheric pressure, not only is the CO conversion of the sour gas shift catalyst improved, but the temperature range for achieving acceptable CO conversion for the sour gas shift catalyst may be enlarged. For example, when the pressure on the feed stream is increased from atmospheric pressure to about 200 psig (1.38 MPa), the sulfidation temperature is set at about 380° C., and the molar ratio of the sulfur to the hydrogen in the sulfidation feed stream is about 1:20, a sulfidation reaction can be conducted which produces catalysts with enhanced CO conversion. Increased pressure on the sulfidation feed stream enhances the CO conversion up to a pressures of at least about pressures of at least about 400 psig or so (2.76 MPa) and alternatively, up to at least about 1160 psig (8 MPa) or so. It has been surprisingly discovered that enhanced pressures on the sulfidation feed stream enhance the performance of the sour gas shift catalysts regardless of the ratio of the sulfur to the hydrogen in the sulfidation feed stream and regardless of the sulfidation temperature. In addition, it has surprisingly been discovered that enhanced pressures on the sulfidation feed stream enhance the performance of the sour gas shift catalysts over a broader range of sulfidation temperatures.

To obtain a sour gas shift catalyst with enhanced CO conversion, in one embodiment, high sulfur/hydrogen ratios within the sulfidation feedstream require higher sulfidation temperatures. In one embodiment to provide effective sour gas shift catalysts within a reasonable sulfidation time, the ratio of the sulfur to hydrogen should be at least 1:100 or so and no more than about 20:1 or so. Further, in one embodiment the sulfidation temperature should be at least about 250° C. and no higher than about 500° C. or so. In addition, by placing the sulfidation feed stream under increased pressure above atmospheric pressure, the CO conversion of the catalyst can also be increased, although acceptable catalysts can be produced without the use of increased pressure on the sulfidation feed sulfidation feed stream.

Sour gas shift reactions using the sulfided catalysts described above are usually carried out in several steps to take advantage of the reaction rates and the position of the equilibrium at different temperatures. The reaction is carried out by passing the sour gas to be converted through one or more reactors.

From the foregoing description, one skilled in the art can ascertain the essential characteristics of the invention. Various changes and modifications to the disclosures herein can be made without departing from the scope of the invention.

EXAMPLES

Figure 3:
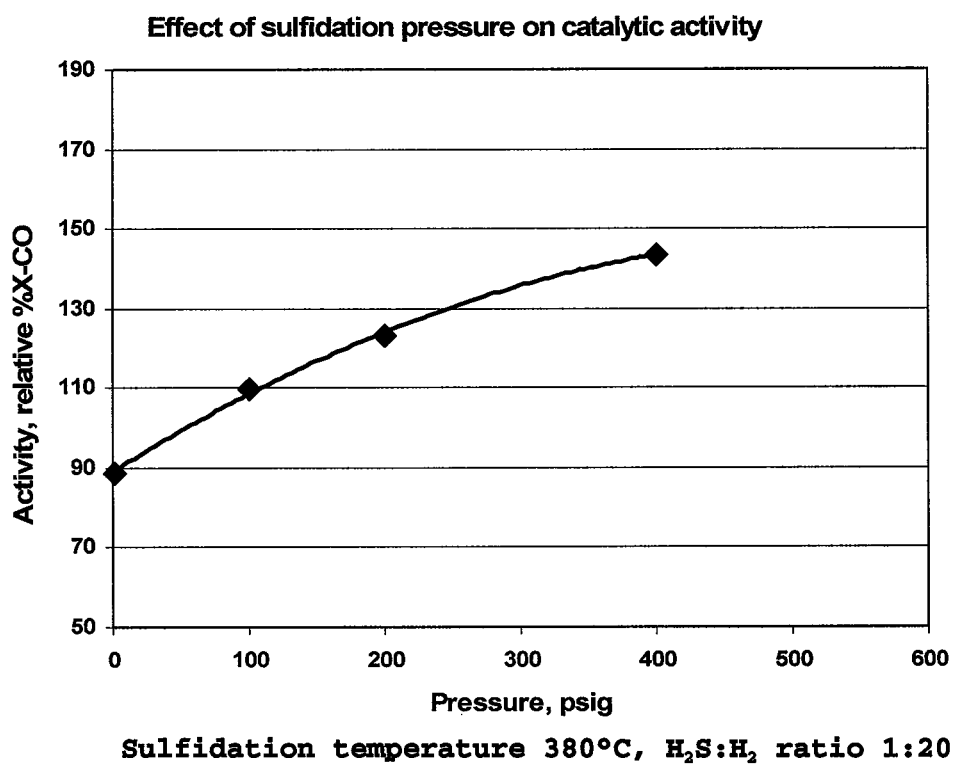
FIG. 3 is a graph showing CO conversion of a sour gas shift catalyst from FIG. 1 sulfided at a $H_2S:H_2$ ratio of 1 to 20 and at a temperature of 380° C. under increasing sulfidation pressures.

A number of sour gas catalysts samples are produced and sulfided at different temperatures and pressures. The ratio of $H_2S:H_2$ in the sulfidation feed stream is varied as shown in FIG. 1. FIG. 2 shows the relationship of sulfidation temperature, $H_2S:H_2$ ratio and activity of six catalysts from FIG. 1, each sulfided at a different $H_2S:H_2$ ratio, on a logarithmic scale. FIG. 3 shows the impact on activity of the catalyst from varying the pressure on the sulfidation feed stream.

To produce each data point on the Figures, 20 cc of a Sud-Chemie ("SC") ShiftMax® 820 Catalyst are loaded into a reactor. For the Examples shown in FIGS. 1 and 2, the catalysts are sulfided at atmospheric pressure. The catalysts are sulfided by passing a sulfidation feed stream for 16 hours over the catalyst. The feed stream is a combination of two feeds, one containing pure $H_2$ and the other containing 50 percent of a mixture of $H_2S$ and $N_2$, with the ratio of $H_2S$ to $H_2$ present in the feed stream being varied. The feed stream is introduced into the reactor by use of two mass flow controllers.

Following sulfidation, each catalyst is tested for CO conversion by kinetic tests performed in a set of tubular reactors (ID=20 mm) run for 50 hours under the following conditions: 200 psig (1.38 MPa); 230° C.; and a dry gas space velocity of 3000 $h^{-1}$. The composition of the feed stream comprises $CO:CO_2:H_2:N_2$ at molar ratios of 40:17:34:9 with 500 ppm $H_2S$ and a steam/gas ratio of 1.0.

Example 1

20 ccs of the SC ShiftMax® 820 Catalyst is sulfided under the conditions stated above for 16 hours at temperatures of 350° C., 380° C. and 400° C. (Optimum 380° C.). The ratio of $H_2S$ to $H_2$ in the sulfidation feed stream is 0.05:1. The results are shown in FIG. 1. The optimum result is also provided in FIG. 2.

Example 2

20 ccs of the SC ShiftMax® 820 Catalyst is sulfided under the conditions stated above for 16 hours at temperatures of 380° C., 390° C., 400° C. and 420° C. (Optimum 400° C.) The ratio of $H_2S$ to $H_2$ in the sulfidation feed stream is 0.1:1. The results are shown in FIG. 1. The optimum result is also provided in FIG. 2.

Example 3

20 ccs of the SC ShiftMax® 820 Catalyst is sulfided under the conditions stated above for 16 hours at temperatures of 400° C., 420° C. and 440° C. (Optimum 420° C.). The ratio of $H_2S$ to $H_2$ in the sulfidation feed stream is 0.2:1. The results are shown in FIG. 1. The optimum result is also provided in FIG. 2.

Example 4

20 ccs of the SC ShiftMax® 820 Catalyst is sulfided under the conditions stated above for 16 hours at temperatures of 430° C., 450° C., 470° C. and 480° C. (Optimum 450° C.). The ratio of $H_2S$ to $H_2$ in the sulfidation feed stream is 1.5:1. The results are shown in FIG. 1. The optimum result is also provided in FIG. 2.

Example 5

20 ccs of the SC ShiftMax® 820 Catalyst is sulfided under the conditions stated above for 16 hours at temperatures of 450° C., 465° C., and 480° C. (Optimum 465° C.). The ratio of $H_2S$ to $H_2$ in the sulfidation feed stream is 4:1. The results are shown in FIG. 1. The optimum result is also provided in FIG. 2.

Example 6

20 ccs of the SC ShiftMax® 820 Catalyst is sulfided under the conditions stated above for 16 hours at temperatures of 470° C., 480° C., and 500° C. (Optimum 480° C.). The ratio of $H_2S$ to $H_2$ in the sulfidation feed stream is 9:1. The results are shown in FIG. 1. The optimum result is also provided in FIG. 2.

Example 7

Additional tests are performed on the catalyst of Example 1 at different pressures as shown in FIG. 3. The four pressures shown are atmospheric, 100 psig (0.69 MPa), 200 psig (1.38 MPa) and 400 psig (2.76 MPa). The temperature of the sulfidation reaction is 380° C. Results are shown in FIG. 3.

As is clear from these figures, the CO conversion of the sour gas shift catalysts is enhanced by coordinating the molar ratio between the hydrogen and the sulfur present in the sulfur containing compound and the temperature of the feed stream while the sulfidation reaction is occurring. The figures also show that as the ratio of the sulfur to the hydrogen increases, the sulfidation temperature should be increased to produce enhanced CO conversion by the sour gas shift catalysts. FIGS. 1 and 2 also show that the best performing catalysts are sulfided at sulfided at lower $H_2S:H_2$ ratios with coordinated lower temperatures within the acceptable sulfidation temperature range. Also, FIG. 3 shows that the activity of the sour gas shift catalyst is increased by increasing the pressure on the sulfidation feed stream above atmospheric pressure during the sulfidation reaction.

Although one or more embodiments have been described in detail it is clearly understood that the descriptions are in no way to be taken as limitations on the scope of the invention. The scope of the invention can only be limited by the appended claims.

What is claimed:

1. A process for sulfidation of a sour gas shift catalyst comprising
   preparing a sour gas shift catalyst,
   preparing a feed stream comprising hydrogen and a sulfur containing compound,
   subjecting the catalyst to the feed stream while coordinating (a) the molar ratio between the sulfur present in the sulfur containing compound and the hydrogen in the feed stream, and (b) the temperature of the feed stream, while the catalyst is being subjected to the feed stream, wherein the molar ratio of the sulfur to the hydrogen in the feed stream is maintained as low as 1:100 and the temperature of the feed stream is maintained as low as 300° C., thereby producing a sulfided sour gas shift catalyst exhibiting enhanced CO conversion, and wherein when the molar ratio of the sulfur to the hydrogen in the feed stream increases, the temperature of the feed stream during sulfidation is also increased and when the ratio of the sulfur to the hydrogen decreases, the temperature of the feed stream during sulfidation is also decreased.

2. The process of claim 1 wherein the molar ratio of the sulfur to the hydrogen in the feed stream is from 1:100 to about 1.5:1 and the temperature of the feed stream is within a range between about 300° C. and 470° C.

3. The process of claim 1 wherein the molar ratio of the sulfur to the hydrogen in the feed stream is from about 1:10 to about 1:5 and the temperature of the feed stream is within a range between about 420° C. and 440° C.

4. The process of claim 1 wherein the sour gas shift catalyst comprises a carrier onto which a combination of (a) cobalt and/or nickel, and (b) molybdenum and/or tungsten are added.

5. The process of claim 4 wherein the carrier is selected from the group consisting of zinc oxide, magnesium oxide, aluminate spinels, magnesium aluminate spinels, clays, alumina, stabilized alumina, which upon calcination is transformed into a gamma phase alumina, promoted alumina, zeolites and mixtures thereof.

6. The process of claim 4 wherein the sour gas shift catalyst further comprises an alkali metal compound.

7. The process of claim 1 wherein the source of sulfur comprises a sulfur containing compound selected from the group consisting of hydrogen sulfide, carbon disulfide, a mercaptan, a thiophenic compound, a dimethylsulfide, a dimethyldisulfide, a sulfur containing compound that can be converted to hydrogen sulfide in the presence of hydrogen, and mixtures thereof.

8. A process for sulfidation of a sour gas shift catalyst comprising preparing a sour gas shift catalyst, preparing a feed stream comprising hydrogen and a sulfur containing compound, passing the feed stream over the catalyst while coordinating (a) the molar ratio between the sulfur, present in the sulfur containing compound, and the hydrogen, and (b) the temperature of the feed stream such that the molar ratio of the sulfur to the hydrogen in the feed stream is within a range from about 1:100 to about 20:1, the temperature of the feed stream is within a range from about 300° C. to about 500° C., thereby producing a sulfided sour gas shift catalyst exhibiting enhanced CO conversion, and wherein when the molar ratio of the sulfur to the hydrogen in the feed stream increases, the temperature of the feed stream during sulfidation is also increased and when the ratio of the sulfur to the hydrogen decreases, the temperature of the feed stream during sulfidation is also decreased.

9. The process of claim 8 wherein the molar ratio between the sulfur and hydrogen in the feed stream is between about 1:20 and 1.5:1 and the temperature of the feed stream is maintained between about 360° C. and 460° C.

10. The process of claim 8 wherein the molar ratio between the sulfur and hydrogen in the feed stream is between about 1:20 and 1:5 and the temperature of the feed stream is maintained between about 360° C. and 440° C.

11. A process for sulfidation of a sour gas shift catalyst comprising preparing a sour gas shift catalyst, preparing a feed stream comprising hydrogen and a sulfur containing compound, pressurizing the feed stream at a pressure in excess of atmospheric pressure, subjecting the catalyst to the feed stream while coordinating (a) the molar ratio between the sulfur present in the sulfur containing compound and the hydrogen, and (b) the temperature of the feed stream while the catalyst is being subjected to the feed stream, wherein the molar ratio of the sulfur to the hydrogen in the feed stream is maintained as low as 1:100 and the temperature of the feed stream is maintained as low as 300° C. thereby producing a sulfided sour gas shift catalyst exhibiting enhanced CO conversion, and wherein when the molar ratio of the sulfur to the hydrogen in the feed stream increases, the temperature of the feed stream during sulfidation is also increased and when the ratio of the sulfur to the hydrogen decreases, the temperature of the feed stream during sulfidation is also decreased.

12. The process of claim 11 further comprising increasing the pressure of the feed stream to a pressure of at least about 100 psig (0.69 MPa).

13. The process of claim 11 further comprising increasing the pressure of the feed stream to a range of pressure from 200 psig (1.38 MPa) up to about 1,160 psig (8 MPa).

14. The process of claim 11 wherein the molar ratio of the sulfur to the hydrogen in the feed stream is from 1:100 to about 1.5:1 and the temperature of the feed stream is within a range between about 300° C. and 470° C.

15. The process of claim 11 wherein the molar ratio of the sulfur to the hydrogen in the feed stream is from 1:10 to about 1:5 and the temperature of the feed stream is within a range between about 420° C. and 440° C.

\* \* \* \* \*